United States Patent
Nishio et al.

(10) Patent No.: US 6,711,656 B2
(45) Date of Patent: Mar. 23, 2004

(54) OPERATION METHOD OF STORAGE AND STORAGE AND REMOTE STORAGE USED THEREIN

(75) Inventors: Takanori Nishio, Tokyo (JP); Mikito Ogata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 139 days.

(21) Appl. No.: 10/032,866

(22) Filed: Dec. 27, 2001

(65) Prior Publication Data

US 2003/0014604 A1 Jan. 16, 2003

(30) Foreign Application Priority Data

Jul. 10, 2001 (JP) .......................... 2001-209840

(51) Int. Cl.[7] .............................. G06F 12/08
(52) U.S. Cl. .................. 711/159; 711/154; 711/165
(58) Field of Search .................. 711/172, 112, 711/154, 159, 165, 111

(56) References Cited

U.S. PATENT DOCUMENTS 6,023,744 A * 2/2000 Shoroff et al. .................. 711/4

FOREIGN PATENT DOCUMENTS

JP 2000-295449 10/2000

* cited by examiner

Primary Examiner—Mano Padmanabhan
Assistant Examiner—Midys Inoa
(74) Attorney, Agent, or Firm—Townsend and Townsend and Crew LLP

(57) ABSTRACT

An operation method of a storage wherein when a storage detects that a remaining amount of its own storage area has become less than a predetermined value, a remote storage area provided by a remote storage connecting with said storage via a predetermined communication means may be used as said storage area.

2 Claims, 9 Drawing Sheets

——————— CAPACITY OF STORAGE AREA DEMANDED BY CLIENT DISK ARRAY DEVICE

▬▬▬▬▬▬▬ CAPACITY OF STORAGE AREA PROVIDED BY INSTALLED DISK UNIT

— — — — CAPACITY OF STORAGE AREA AT TIME OF UTILIZATION OF REMOTE UNIT

PORT MANAGEMENT TABLE

| PORT ID | CLASS | SLOT ID | SIZE | TYPE | STARTING DATE OF OPERATION | REMOTE UNIT ID |
|---|---|---|---|---|---|---|
| 001 | INSTALLED | A | 20GB | HI-1 | 2001/01/05 | |
| 002 | INSTALLED | B | 50GB | IM-1 | 2001/01/05 | |
| 003 | INSTALLED | C | 50GB | SG-1 | 2001/01/05 | |
| 004 | INSTALLED | D | 20GB | HI-1 | 2001/01/05 | |
| 005 | INSTALLED | E | 20GB | HI-1 | 2001/01/05 | |
| 006 | INSTALLED | F | 20GB | HI-1 | 2001/01/05 | |
| 007 | INSTALLED | G | 50GB | QM10 | 2001/01/05 | |
| 008 | INSTALLED | H | 50GB | QM11 | 2001/03/22 | |
| 009 | INSTALLED | I | 50GB | QM12 | 2001/03/22 | |
| 010 | REMOTE | — | 50GB | — | | RM-010 |
| 011 | REMOTE | — | 50GB | — | | RM-011 |
| 012 | REMOTE | — | 50GB | — | | RM-012 |
| . | . | . | . | . | . | . |
| . | . | . | . | . | . | . |
| . | . | . | . | . | . | . |
| . | . | . | . | . | . | . |

FIG. 4

PORT MANAGEMENT TABLE

| PORT ID | SLOT ID | SIZE | TYPE | STARTING DATE OF OPERATION | OPERATION STATE | DEVICE ID |
|---------|---------|------|------|---------------------------|-----------------|-----------|
| 001 | A | 20GB | HI-1 | — | NOT USED | — |
| 002 | B | 50GB | IM-1 | 2001/01/05 | MOUNTING | I5542 |
| 003 | C | 50GB | SG-1 | 2001/01/05 | MOUNTING | F1041 |
| 004 | D | 20GB | HI-1 | 2001/01/05 | MOUNTING | I3314 |
| 005 | E | 20GB | HI-1 | — | NOT USED | — |
| 006 | F | 20GB | HI-1 | — | NOT USED | — |
| 007 | G | 50GB | QM10 | — | NOT USED | — |
| 008 | H | 50GB | QM10 | — | NOT USED | — |
| 009 | I | 50GB | QM10 | — | NOT USED | — |
| 010 | J | 50GB | HI-2 | — | NOT USED | — |
| 011 | K | 50GB | HI-2 | — | NOT USED | — |
| 012 | L | 50GB | HI-2 | — | NOT USED | — |
| . | . | . | . | . | . | . |
| . | . | . | . | . | . | . |
| . | . | . | . | . | . | . |
| . | . | . | . | . | . | . |

FIG. 6

READ-OUT PROCESS

OPERATION METHOD OF STORAGE AND STORAGE AND REMOTE STORAGE USED THEREIN

BACKGROUND OF THE INVENTION

The present application claims priority upon Japanese Patent Application No. 2001-209840 filed on Jul. 10, 2001, which is herein incorporated by reference.

1. Field of the Invention

The present invention relates to an operation method of a storage, and particularly relates to a technique of providing an operation method of a storage which may promptly and easily enlarge a storage area of the storage in a case there is shortage in a remaining amount of the storage area of the storage, and which there is little waste for and may satisfy both a user and a provider of the storage.

2. Description of the Related Art

In accordance with development of IT techniques, a demand for a storage to contain a large amount of data is rapidly increasing. In particular, so-called data centers, performing operation of such as the recent ASP (Application Service Provider) related system and a Web system, are introduced with multiple disk array devices as a storage to store and manage a large amount of data which these systems handle.

As is well known, a disk array device has insertion slots for a plurality of disk units. When the disk array device is initially introduced, normally only the least number of necessary disk units required for the disk array device are installed, and the disk array device was operated in a form with the disk units appropriately increased when there was shortage of the storage area.

Here, the increase of the disk unit performed in the above operation form is normally performed in an arrangement where the user of the disk array device requests an enterpriser to increase the disk units and the enterpriser undertaking this work sends a service man to an established place of the disk array device, and the service man performs the increase of the disk unit. However, for example, when the popularity of a web site increases and a data amount rapidly increases, there is fear that the operation of the system may be interfered since the increase of the disk unit was not on time.

Thus, in order to promptly cope with the rapid increase of such data amount, there exists a disk array device comprising a function known as "on-demand function". In this device, spare disk units are installed on the disk array device in advance, and when there is shortage of the remaining amount of the storage area of the disk array device, the spare disk units may be used by performing a simple operation to the disk array device (for example, refer to Japanese Patent Application 2000-295449). Note that, normally the spare disk units are temporarily provided for free for prompt coping, and the user who used the spare disk unit is to pay for the purchase price of the spare disk units afterwards.

Incidentally, there is a problem with the above on-demand function as follows. That is, the spare disk unit installed on the disk array device is not necessarily used, and accordingly the provider of the storage has a risk by installing the spare disk unit. Particularly the recent technical innovation of the disk unit is remarkable, and the spare disk unit, which is installed on the disk array device and has ended its term without being used and become obsolete, may not be easily used for other purposes and has a high possibility of becoming a poor stock.

Further, there are cases where the increase in the data amount is just transitory, and in such a case, even though the spare disk unit is purchased it may immediately become unnecessary, and the user is forced to purchase an expensive spare disk unit just for temporary use. Thus it is not a mechanism which necessarily satisfies the user. Further, when the installed spare disk units are all used up at an earlier time than initially expected, in the end, the enterpriser has to be contacted for an increase request, and the above mentioned conventional procedures have to be performed.

SUMMARY OF THE INVENTION

A main invention of the present invention to achieve the above object, is an operation method of a storage in which when the storage detects that a remaining amount of its own storage area is less than a predetermined value, a remote storage area provided by a remote storage connected to the storage via a predetermined communication means is utilized as the storage area.

BRIEF DESCRIPTION OF THE DRAWINGS

Other objects and advantages of the invention will become apparent during the following discussion of the accompanying drawings, wherein:

FIG. 2 is a diagram showing time sequential changes of a capacity of a storage area required by a client disk array device, a capacity of the storage area provided by an installed disk unit, and the like;

FIG. 4 is a diagram showing a port management table according to an embodiment of the present invention;

FIG. 6 is a diagram showing a utilization state management table according to an embodiment of the present invention;

DETAILED DESCRIPTION OF PREFERRED EMBODIMENTS

Figure 1:
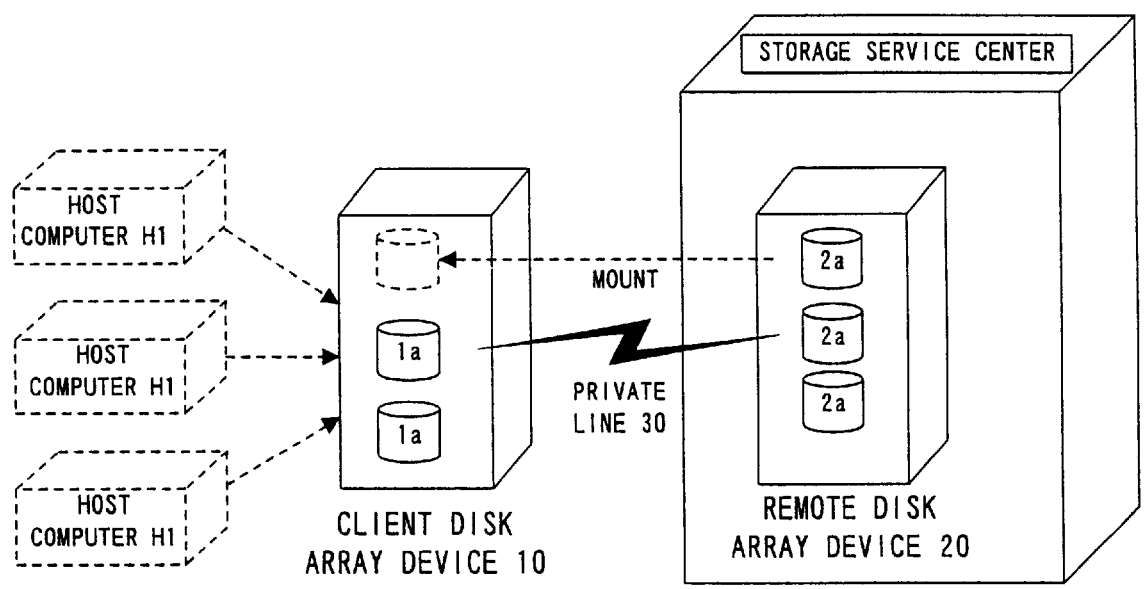
FIG. 1 is a diagram showing a concept of an operation method of a storage according to an embodiment of the present invention.

FIG. 1 shows a concept of an operation method of a storage of the present invention. A disk array device 10 sold by an enterpriser A and provided to a client B is installed in a place designated by the client B such as a data center, and is operated. (The disk array device 10 corresponds to "storage" in the scope of claims. Hereinafter referred to as "client disk array device".) On the other hand, in a storage service center which is managed by the enterpriser A and is in a remote place from the designated place, there is installed and worked a disk array device 20 which the enterpriser A operates. (The disk array device 20 corresponds to "remote storage" in the scope of claims. Hereinafter, referred to as "remote disk array device".) The client disk array device 10 and the remote disk array device 20 are connected by a private line 30.

The client disk array device 10 monitors a remaining amount of a storage area, and when the client disk array device detects that the remaining amount of its own storage area has decreased, such is displayed to a management terminal C1 and is warned. When there is the above warning, an operator who is performing the monitoring of a working state of the client disk array device 10, connects a disk unit 2a (hereinafter, referred to as "remote unit") installed on the remote disk array device 20 via the private line 30 to be made usable. (This procedure is hereinafter referred to simply as "mount".)

The client disk array device 10 handles the mounted remote units 2a the same as the actually-installed disk units. That is, for the client B, by mounting the remote unit 2a, it becomes the same as increasing a disk unit on the client disk array device 10.

In the case that the remote unit 2a does not have to be used since a new disk unit is increased to the client disk array device 10 or the data amount to be stored and managed decreases, the client B conducts predetermined operations as mentioned later to the client disk array device 10 in order to stop the utilization of the remote unit 2a.

Figure 2:
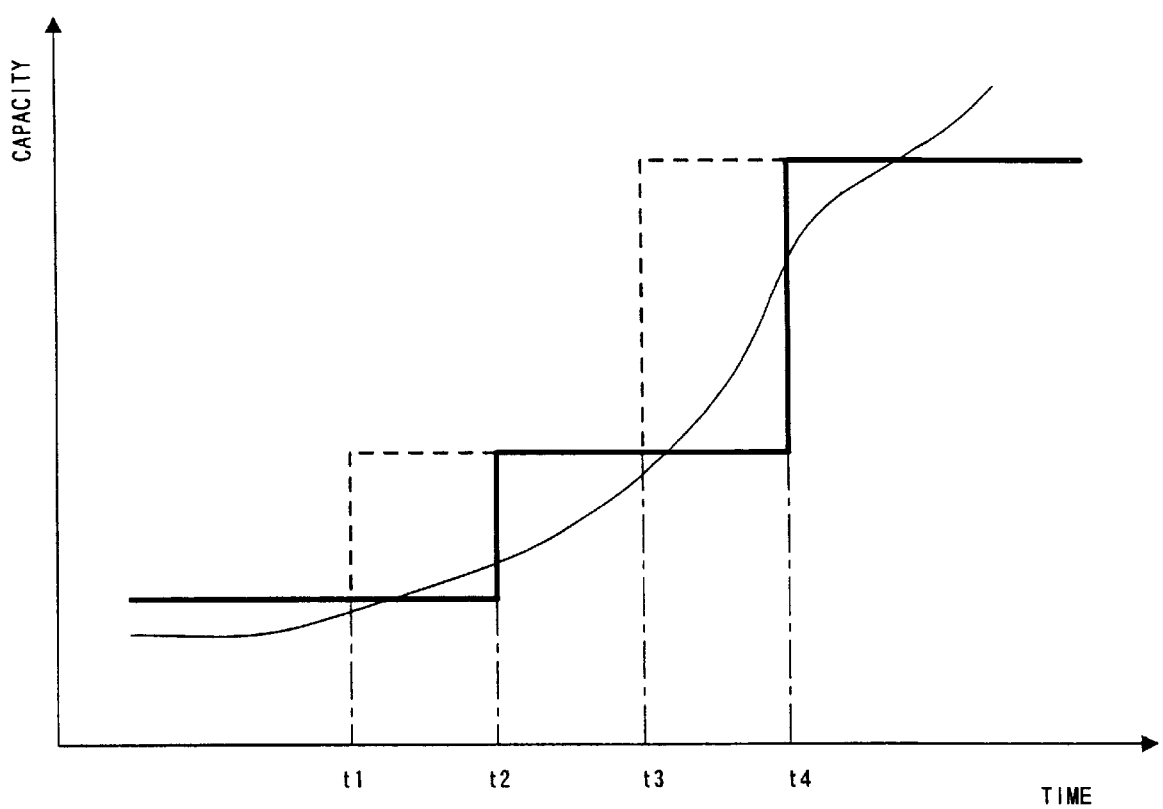

FIG. 2 shows a time sequential change of a storage area capacity required by the client disk array device 10 (thin line), a storage area capacity provided by the disk units actually installed on the client disk array device 10 (straight line), and a storage area capacity provided by the client disk array device 10 when using the remote unit 2a (dotted lines). In this diagram, for example, conventionally at the time of t1 and t3, an increase of a disk unit or utilization of a spare disk unit was started, but in the case of this client disk array device 10, the remote unit 2a is to be used in the t1 to t2 section or the t3 to t4 section. That is, the client B may promptly use the remote unit 2a at any time, and there is no fear of an effect to the system, which is operated by utilizing the client disk array device 10, due to shortage of the storage area. Further, it is possible to purchase the disk units to be increased after seeing the tendency of data-amount change by temporarily utilizing the remote unit 2a. (Note that, in this case, of course it is assumed that the utilization cost of the remote unit 2a is set at a lower cost than the purchase price of the disk unit). On the other hand, the enterpriser A may promptly cope with the demand for securing the storage area from the client by providing the remote unit 2a, and the clients' needs may be surely grasped and linked to business.

Figure 3:
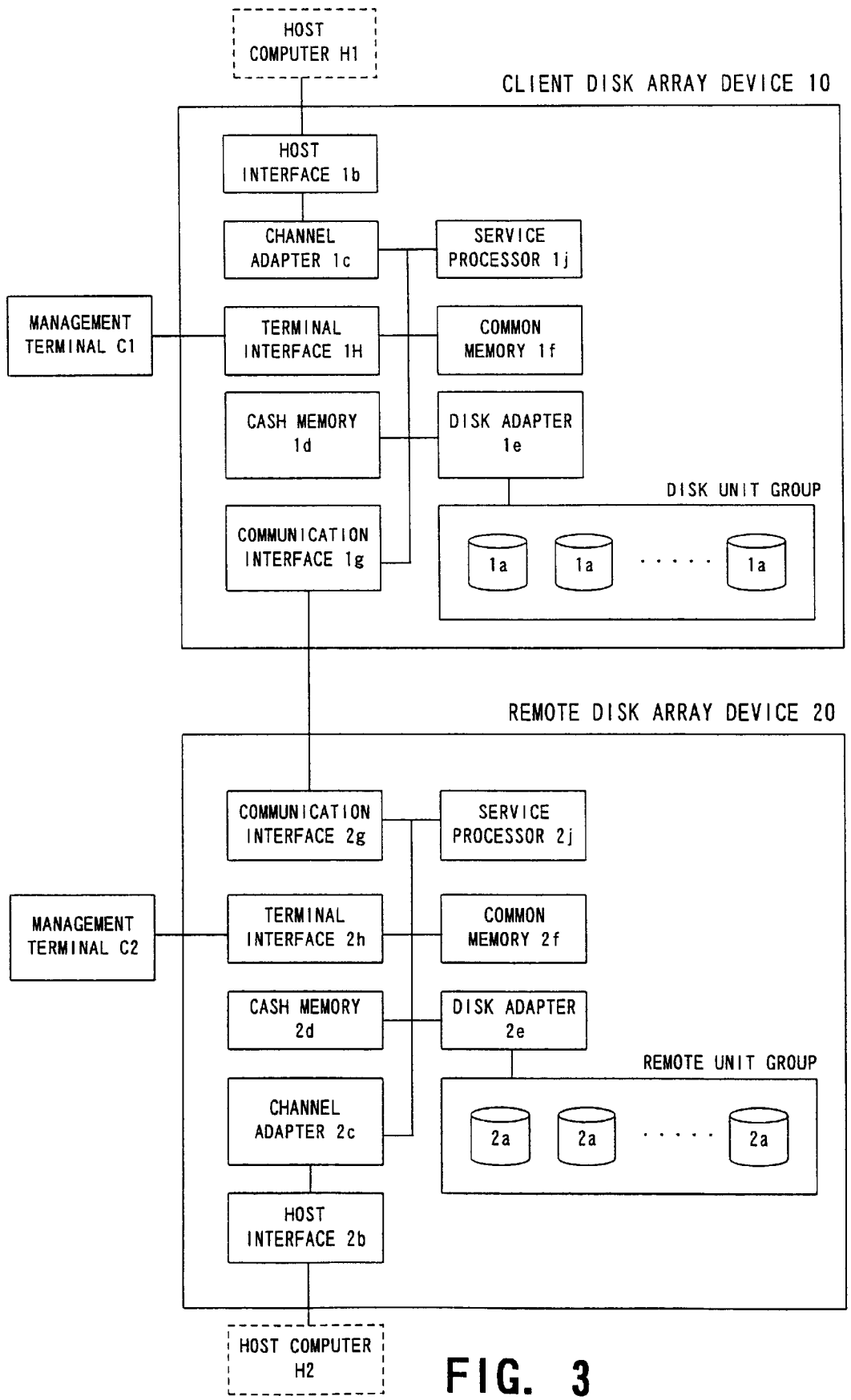
FIG. 3 is a diagram showing in more detail structures of the client disk array device and a remote disk array device in the operation method of the storage in an embodiment of the present invention.

Next, the mechanisms as shown above are explained in detail. FIG. 3 shows in more detail the structure of the client disk array device 10 and the remote disk array device 20 which are operated as above. These disk array devices 10, 20 are structured by comprising: the plurality of disk units 1a, 2a actually installed on the insertion slots respectively, host interfaces 1b, 2b and channel adapters (CHA) 1c, 2c for performing communication and I/O control with host computers H1, H2 which access the disk array devices 10, 20, cash memories 1d, 2d which function as data buffers at the time of write-in, disk adapters (DKA) 1e, 2e for staging/de-staging to the cash memory the write-in object data to the disk unit, common memories 1f, 2f structured by such as ROM and RAM, communication interfaces 1g, 2g for controlling communication by the private line 30, terminal interfaces 1h, 2h performing communication control with management terminals C1, C2 which perform monitoring of various operation settings and working states of the respective disk array devices 10, 20, and service processors 1j, 2j performing unification control of the respective disk array devices 10, 20 and execution control of such as an OS (operating system) which is operated thereon.

The disk units 1a actually installed on the client disk array device 10 are assigned with inherent port IDs, respectively. The port IDs are set by the operator manipulating the management terminal C1 at such as when the client disk array device 10 is being newly set, or when the disk units are being increased. The control program and/or the OS operating on the client disk array device 10 specifies the disk unit 1a installed on the client disk array device 10 from its port ID. That is, the disk units 1a installed on the client disk array device 10 are in a non-working state when the port IDs are not imparted, and are in an working state after the port IDs are imparted which may be referred to by the control program and/or the OS. Note that, "mount" as mentioned above specifically means that the disk units are made to be in an working state so that they may be referred to by the control program and/or the OS. The correspondence of the port ID and the disk unit is stored and managed in a port management table shown in FIG. 4 which is stored in the client disk array device 10. (Note that, in FIG. 4, by corresponding the port ID with a slot ID to which the disk unit is installed, the disk unit is indirectly corresponded with the port ID.)

Figure 5:
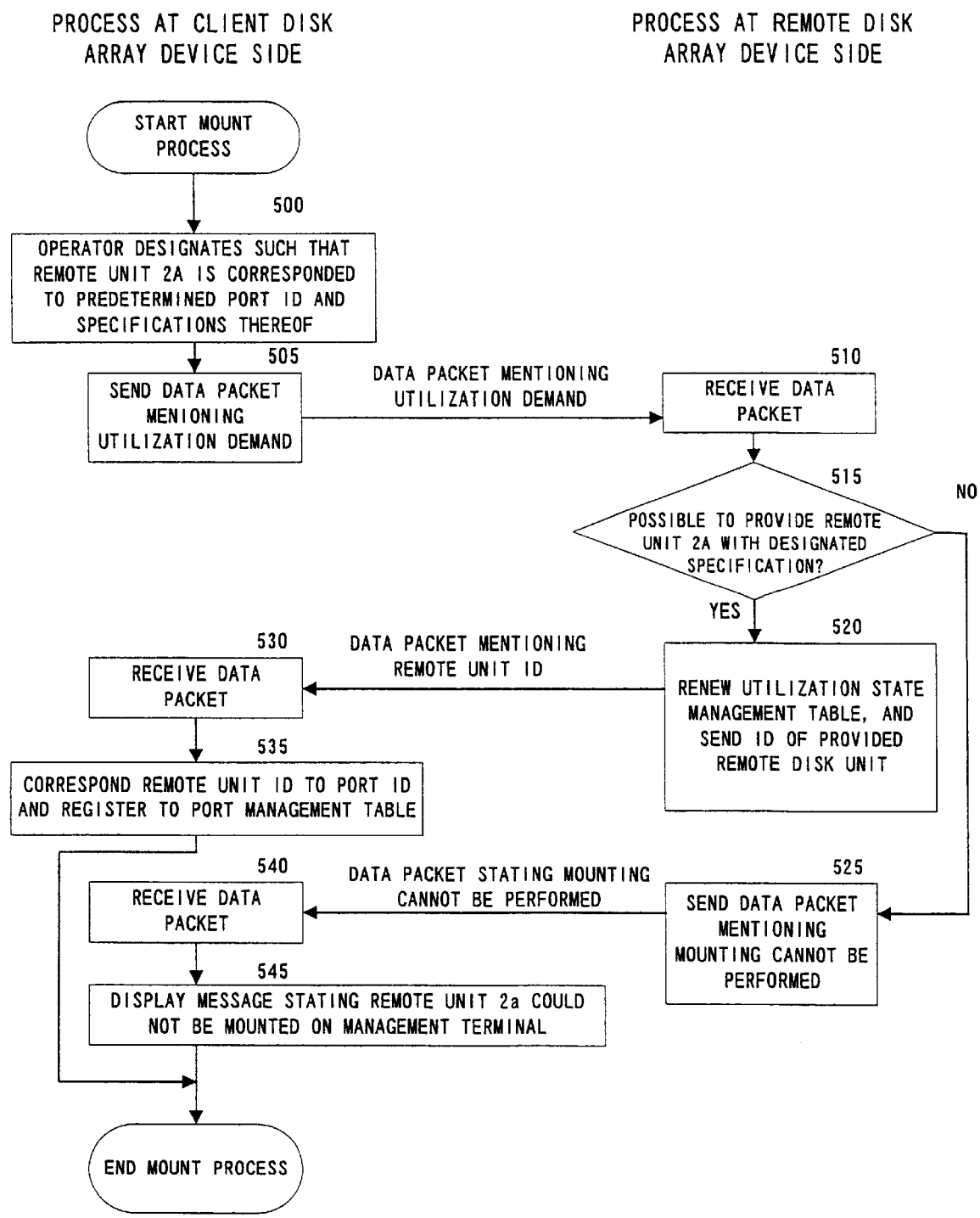
FIG. 5 is a diagram showing a flowchart explaining a mounting process of the remote unit according to an embodiment of the present invention.

Next, with the flow chart shown in FIG. 5, the procedure of mounting the remote unit 2a on the client disk array device 10 will be explained. The mounting of the remote unit 2a is performed by the operator manipulating the management terminal C1 (500). When mounting, the operator manipulates a user interface of the management terminal C1 and performs a designation command to correspond the remote unit 2a to a predetermined port ID of the client disk array device 10. Note that, at the time of this designation, specifications such as the size, logic format (such as NTFS, UNIX, MS-DOS), and performance (such as a speed of reading and writing) of the remote units 2a may be designated. When these designations are performed, the client disk array device 10 sends a data packet mentioning a utilization demand message of the remote unit 2a and the designated specifications to the remote disk array device 20 (505). Note that, for calculating the utilization cost of the remote disk array device 20, the data packet is to accompany an ID of the disk array device (such as a manufacturing number) which is stored and managed in the client disk array device 10.

When the remote disk array device 20 receives the data packet mentioning the utilization demand message (510), it refers to the specifications mentioned therein, and decides whether it is possible to provide the remote unit 2a corresponding to this specification (515). The decision here is made based on a utilization state management table shown in FIG. 6 which mentions a specification and a utilization state of the respective disk units installed on the remote disk array device 20, and which is stored and managed in the remote disk array device 20.

If it is decided that a remote unit 2a with the above specification may be provided, the remote disk array device 20 sends, to the client disk array device 10, a data packet mentioning the above decision and an ID of a remote unit (hereinafter referred to as "remote unit ID") to be mounted to the client disk array device 10. Further, with the sending of such data, the utilization state management table is made to reflect that the remote unit 2a has become utilized (520). On the other hand, when it is decided that a remote unit 2a may not be provided, a data packet mentioning this decision is sent to the client disk array device 10 (525).

When the client disk array device 10 receives the data packet stating that it has secured a remote unit, the remote unit ID mentioned in this packet is made to correspond to the port ID designated by the operator and is registered in the port management table (530 to 535).

On the other hand, when the data packet stating that a remote unit 2a could not be secured is received from the remote disk array device 20, the client disk array device 10 displays a message stating that a remote unit 2a could not be mounted to the display of the management terminal C1 and notifies the operator (540 to 545). Note that, in this case, by such as changing the specifications of a remote unit 2a, the operator again tries to mount the remote unit 2a.

Next, a series of processes related to the reading and writing of data in respect to the remote unit 2a mounted on the client disk array device 10 is explained.

Figure 7:
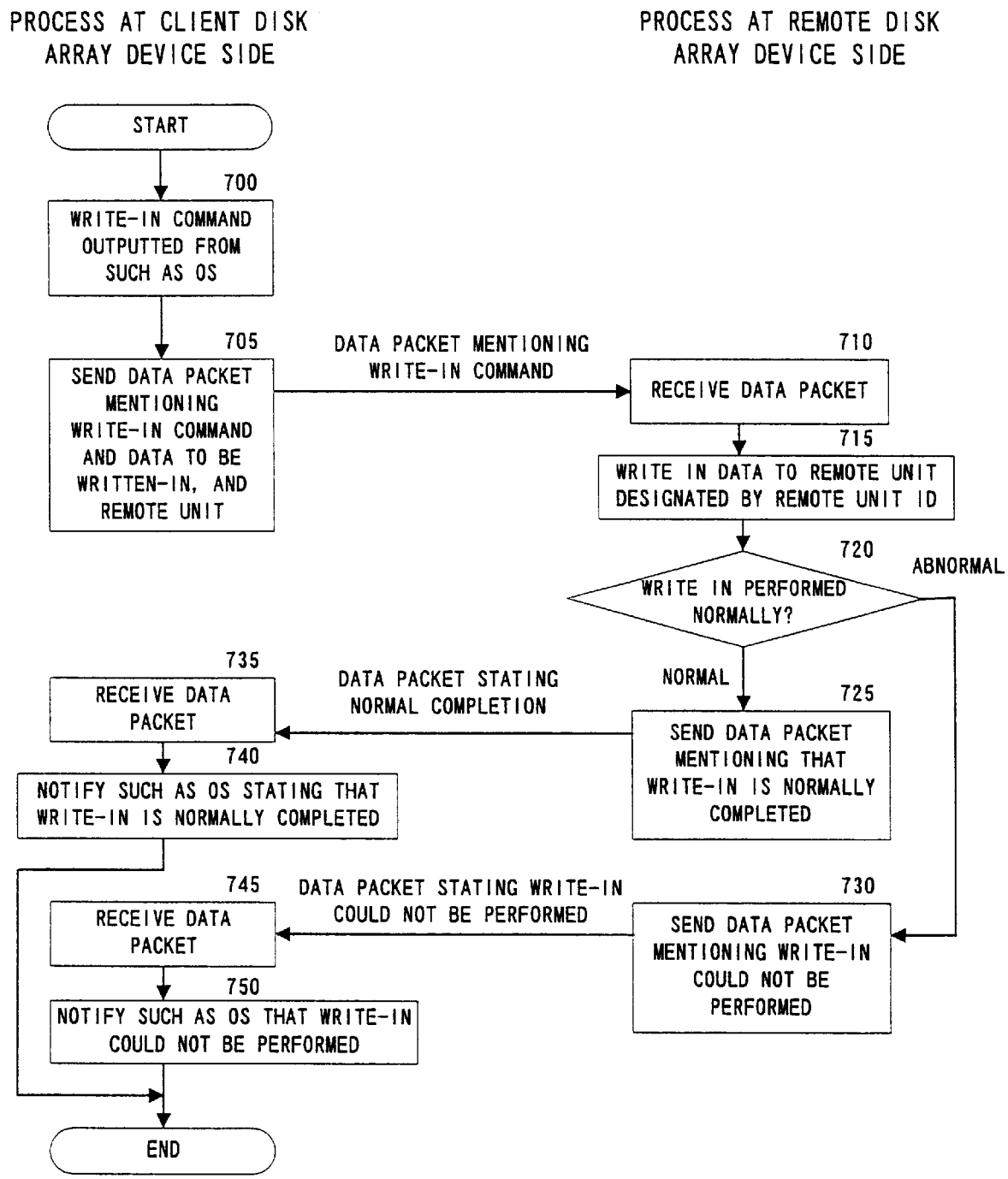
FIG. 7 is a diagram showing a flowchart explaining data write-in processes to the remote unit according to an embodiment of the present invention.

First, a series of processes related to a write-in process is explained with the flowchart shown in FIG. 7. For example, when a command to write-in data to a certain port ID which corresponds with the remote unit 2a is outputted from the OS or the control program operating in the client disk array device 10 (700), the client disk array device 10 sends a data packet mentioning the above-mentioned data, such write-in command, and the remote unit ID corresponding to the port ID to the remote disk array device 20 via the private line 30 (705).

When the remote disk array device 20 receives the data packet, the data, which is the write-in object mentioned in the data packet, is written in to the remote unit 2a which corresponds to the remote unit ID mentioned in the data packet (710 to 715). When this write-in is performed normally, the remote disk array device 20 sends to the client disk array device 10 a data packet mentioning that the write-in has been performed normally (720 to 725). When the client disk array device 10 receives the data packet, the OS and/or the control program are notified that the write-in has been performed normally, and with this the write-in process is complete (735 to 740). Further, if the write-in is not performed normally (is abnormal), such is notified to the client disk array device 10, and further such is notified from the client disk array device 10 to the OS and the like (730 to 750).

Figure 8:
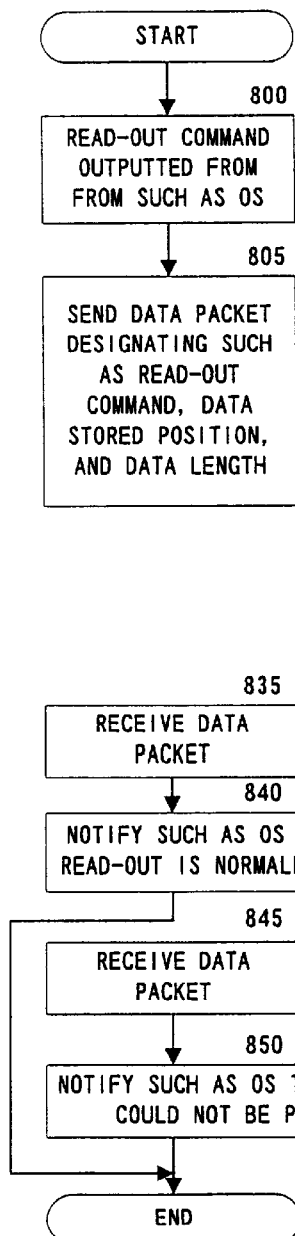
FIG. 8 is a diagram showing a flowchart explaining data read-out processes from the remote unit according to an embodiment of the present invention.
Figure 8:
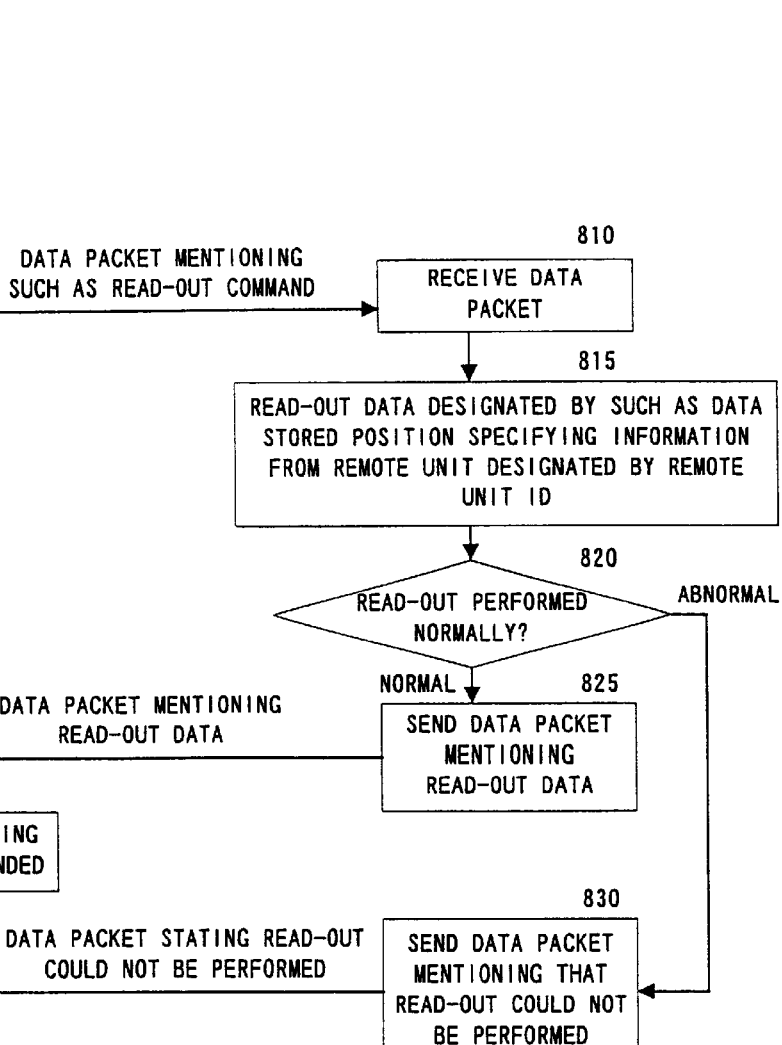

On the other hand, a series of processes related to the read-out of data from the remote unit 2a is explained with the flowchart shown in FIG. 8. For example, when there is a command to read-out data in respect to a certain port ID which corresponds with a remote unit 2a from such as the OS working on the client disk array device 10 (800), the client disk array device 10 sends a data packet including the data read-out command, a data-stored-position-specifying information, a data length, and the remote unit ID corresponding to the port ID, to the remote disk array device 20 via the private line 30 (805). Note that, the data-stored-position-specifying information is information which the OS attaches to the read-out command, and for example, is information of track, cylinder and sector to which data to be read out is recorded.

When the data packet is sent to the remote disk array device 20, it reads out the data corresponding to the data-stored-position-specifying information and the data length in the relevant remote unit 2a, and sends a data packet mentioning the data to the client disk array device 10 (810 to 825). Further, when the read-out of data fails, a data packet stating such is sent to the client disk array device 10 (830). When the data packet is received, the client disk array device 10 draws out the read-out data from this data packet, and hands the data to the OS. Further, when the read-out is not performed normally (when it is abnormal), such is notified to the client disk array device 10, and further such is notified to the OS or the like from the client disk array device 10 (830 to 850). In this way the series of processes relating to the read-out of data is completed.

By the way, as mentioned above, in a case where the remote unit is no longer needed for reasons such as when disk units are increased in the client disk array device 10 and the storage area of the client disk array device 10 is enlarged, or the data amount handled by the system using the client disk array device 10 decreases, then the client B stops the utilization of the remote unit. This stopping process is performed as follows. First, the data of the remote unit 2a is copied to the disk unit actually installed on the client disk array device 10. Note that, this copying may be performed by the client B himself/herself, or the enterpriser A may act for the client B by collecting a commission. Further, the enterpriser A may provide a service of copying the data of the remote unit 2a to the disk units to be newly increased to the client disk array device 10, and then installing the disk unit to the client disk array device 10.

When the copying is complete, next the operator manipulates the management terminal C1 and then releases the port ID corresponding with the remote unit 2a (or, assigns the port ID to a newly increased disk unit). Further, when the remote unit 2a is released, a data packet including the ID of the released remote unit and a notice that its use will be stopped is sent to the remote disk array device 20. Then, when the data packet is sent to the remote disk array device 20, it changes a section of the remote unit 2a mentioned in the utilization state management table from "mounting" to "not used". In this way the series of processes related to stopping the utilization of the remote unit 2a is completed.

In regards to the explanation of the read-write process of data to the above mentioned remote unit 2a, the movement of the staging or de-staging to the cash memory of the data performed by the disk adapter (DKA) 1e is not mentioned, but in actuality, at the time of the read-write process of data to the remote unit 2a, these processes appropriately exist. That is, when the object data is staged in the cash memory 1d at the time of read-out of the data, the client disk array device 10 does not perform the read-out process from the remote unit 2a, but uses the data on the cash memory 1d, and performs the read-out process from the remote unit 2a only when the object data is not staged. Further, at the time of write-in of the data to the remote unit 2a, the client disk array device 10 once stages the write-in object data to the cash memory 1d, then performs the write-in process to the remote unit 2a at an appropriate opportunity, such as a de-staging timing such as shutdown of the client disk array device 10, or when the total of the sizes of the staged write-in object data exceeds the predetermined amount.

Note that, according to the data read and write method to the remote unit 2a as mentioned above, the remote unit 2a which is mounted on the client disk array device 10 is provided to the host computer H1 side as one of the actually-installed disk units 1a. Therefore, it is not at all necessary to grasp whether the actually-installed disk unit 1a is being utilized, or whether the remote unit 2a is being utilized at the host computer H1 side utilizing this client disk array device 10.

At the time of utilizing the remote unit 2a, if the communication speed of the private line 30 is slow, there is a fear of affecting a performance such as a turn-around time of the client disk array device 10. As a method of preventing the deterioration of this performance, for example, based on access frequency of a file (or data) stored and managed in the disk unit actually installed on the client disk array device 10 or the remote unit 2a, the files with low access frequency may be stored and managed with priority in the remote unit 2a. Further, by monitoring utilization frequency of the respective disk units, it may be considered to store and manage data in a disk unit with low utilization frequency with priority in the remote unit 2a.

Figure 9:
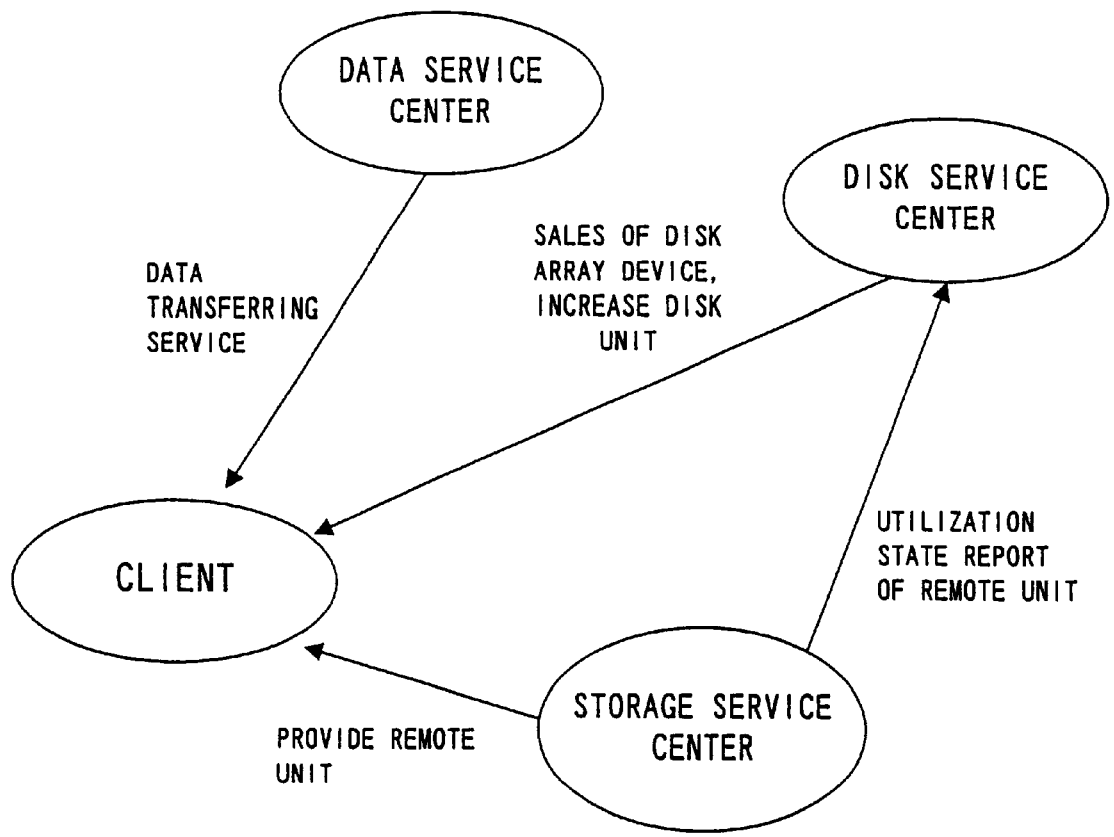
FIG. 9 is a diagram showing an example of a service management method related to the storage which is related to the operation method of the storage of the present invention.

The enterpriser A may expand a business sphere more than conventionally by developing the providing service of the remote unit 2a as mentioned above. For example, as shown in FIG. 9, in addition to the disk service center businesses of performing such as sales and setting of the disk array device and increasing the disk units as performed conventionally, by managing the storage service center performing the operations of the above mentioned remote disk array device 20, and providing a center such as a data service center which performs a transferring service of data managed by the remote unit 2a to the increased disk unit when the client using the remote unit 2a decides to purchase the disk array device 10, then multiple sales strategies related to the sales and operations of the disk units may be developed, to thereby expand the source of earnings. Further, by transmitting such as the utilization states of the client disk array device 10 between the respective service centers of the remote unit 2a, it becomes possible to surely capture a business chance such as a timing to urge the client to increase a disk unit. Further, by being able to cope promptly, an image provided to the clients improves.

Further, as mentioned above, the enterpriser A provides the remote unit 2a for pay. The utilization cost is, for example, calculated by an appropriate billing method of such as a pay-per-time basis according to a utilization record of the remote unit 2a of such as the starting date of utilization and the ending date of utilization, which record being stored and managed in the client disk array device 10 or the remote disk array device 20 for each of the above device IDs. Further, when the client disk array device 10 is being provided to a plurality of clients, for example, the correspondence of the device ID of the client disk array device 10 and the client ID may be managed in the storage service center, and the utilization cost may be totaled for each client ID. Further, for each client, the utilization limit of the remote unit 2a, for example a maximum size which may be utilized, a maximum utilization cost and the like, may be stored and managed in the storage service center, and when there is a utilization demand exceeding this utilization limit, such utilization may be limited. Further in this case, it may be structured so the setting of the utilization limit may be conducted from the management terminal C1 of the client disk array device 10 through the private line 30.

The above embodiment explains a case where the disk array device 10 does not have the above mentioned on-demand function, but of course a case where the disk array device 10 has the on-demand function is also applicable. Note that, in a case where the disk array device 10 has the on-demand function, that is, in a case in which a spare disk unit is installed, an operation method of mounting the remote unit 2a when all the spare disk units are used up may be considered, and also a method of use of observing the tendency in the change of data amount by using the remote unit 2a for the time being before the purchase of a spare disk unit, and then deciding whether or not to purchase the spare disk unit, is also possible.

The above embodiment is a structure where the remote unit 2a is mounted one at a time to the client disk array device 10, but for example, a large capacity remote unit 2a may be installed on the remote disk array device 20, and one remote unit 2a may cover a plurality of mounts. Further, the above embodiment is a structure in which one remote disk array device 20 supports the remote unit 2a for one client disk array device 10, but a structure where one remote disk array device 20 supports the remote units 2a of a plurality of client disk array devices 10, or a structure where one client disk array device 10 mounts the remote units 2a of a plurality of remote disk array devices 20 may also be considered.

In the above embodiment, there is provided a structure where the operator mounts the remote unit 2a, but for example, it may be a mechanism where the remote unit 2a is automatically mounted when the remaining amount of the storage area becomes a predetermined value or less.

The communication means connecting the client disk array device 10 and the remote disk array device 20 is not limited to that which utilizes the above mentioned private line 30, and may use other communication means such as a public line of a telephone network, ISDN network, or the Internet and the like. Further, with an appropriate encrypting process, security may be increased for the communication between the client disk array device 10 and the remote disk array device 20.

A list of the specifications of the remote unit 2a, which may be provided by the remote disk array device 20, may be sent from the remote disk array device 20 to the client disk array device 10 at an appropriate timing, and this list may be displayed to the management terminal C1 at the time the operator is mounting the remote unit 2a. Further, at the time of mounting of the remote unit 2a, when the operator selects predetermined specifications from the displayed list, such specifications may be automatically sent to the remote disk array device 20 together with the demand for mounting.

Further, in the above embodiment, the disk array device was mentioned as the storage, but of course the operation method of the storage of the present invention may be applied to other types of storages, for example, a storage using other recording medium such as a semiconductor disk.

According to the above structure, it is possible to provide an operation method of a storage which may promptly and easily expand a storage area of a storage when there is a shortage of the remaining amount of the storage area of the storage, and where there is little waste for both the user and provider of the storage.

Although the preferred embodiment of the present invention has been mentioned in detail, it should be understood that various changes, substitutions and alternations can be made therein without departing from spirit and scope of the inventions as defined by the appended claims.

What is claimed is:

1. A method of operating a storage wherein when a storage detects that a remaining amount of its own storage area has become less than a predetermined value, a remote storage area provided by a remote storage connecting with said storage via a predetermined communication means is made available as said storage area, wherein data or a file with low utilization frequency is stored and managed with priority in said remote storage area.

2. A method of operating a storage wherein when a storage detects that a remaining amount of its own storage area has become less than a predetermined value, a remote storage area provided by a remote storage connecting with said storage via a predetermined communication means is made available as said storage area, wherein a utilization record of said remote storage area of said storage is stored and managed in said remote storage, and wherein a utilization cost of said remote storage area is calculated based on said utilization record.

* * * * *